(12) United States Patent
Brass

(10) Patent No.: US 6,955,624 B2
(45) Date of Patent: Oct. 18, 2005

(54) MOTOR VEHICLE DRIVETRAIN HAVING AT LEAST TWO CNT'S AND FLYWHEELS

(76) Inventor: Dwight Stanford Brass, 400 E. Richardson Springs Rd., Edgerton, WI (US) 53534

( * ) Notice: Subject to any disclaimer, the term of this patent is extended or adjusted under 35 U.S.C. 154(b) by 0 days.

(21) Appl. No.: 10/731,785

(22) Filed: Dec. 9, 2003

(65) Prior Publication Data

US 2004/0121874 A1 Jun. 24, 2004

Related U.S. Application Data

(60) Provisional application No. 60/432,944, filed on Dec. 12, 2002.

(51) Int. Cl.[7] ............................ F16H 15/48; F16H 3/22; G05G 1/00
(52) U.S. Cl. ............................ 475/193; 74/572; 74/347
(58) Field of Search ................................ 475/193, 207, 475/209; 74/5.34, 5.37, 572, 347–8

(56) References Cited

U.S. PATENT DOCUMENTS

| | | | |
|---|---|---|---|
| 53,202 A | | 3/1866 | Wait .......................... 74/349 |
| 1,727,232 A | * | 9/1929 | Farrell ......................... 475/72 |
| 1,868,676 A | | 7/1932 | Stoeckicht ................... 476/48 |
| 3,340,749 A | * | 9/1967 | Schrciner et al. ........... 475/211 |
| 4,533,011 A | | 8/1985 | Heidemeyer et al. ...... 180/65.2 |
| 4,588,040 A | * | 5/1986 | Albright et al. ............ 180/165 |
| 5,024,112 A | * | 6/1991 | Kidd ........................... 74/5.37 |
| 5,226,854 A | * | 7/1993 | Hauser ......................... 474/83 |
| 5,603,671 A | * | 2/1997 | Schmidt ......................... 475/5 |
| 5,984,820 A | * | 11/1999 | Wedeniwski ................ 475/193 |
| 6,055,880 A | | 5/2000 | Gogovitza .................... 74/349 |
| 6,349,607 B1 | | 2/2002 | Gogovitza .................... 74/457 |
| 6,488,605 B2 | * | 12/2002 | van Druten et al. ........ 475/207 |

FOREIGN PATENT DOCUMENTS

| | | | |
|---|---|---|---|
| DE | 19917276 | 10/2000 | ............ B60K/6/04 |
| JP | 20011330101 | 11/2001 | ............ F16H/15/38 |

* cited by examiner

*Primary Examiner*—Roger Pang
(74) *Attorney, Agent, or Firm*—Donald J. Ersler

(57) ABSTRACT

This design is for a motor vehicle drivetrain utilizing flywheel rotation to store energy during the vehicle trip, either storing energy when accellerated, or releasing energy when slowed depending on the vehicle power requirements. At the same time the engine is allowed to operate at a constant RPM and throttle setting, determined by the best thermal efficiency of the engine selected (the engine itself is not a part of this patent application). The continously variable speeds of the vehicle are made possible by the design's transmissions using sintered metal construction, a cogged drive belt, and a pattern of surface protrusions meshing with the cogged drive belt. The flywheels are slightly offset to allow simple gear meshing, and are counter-rotating to cancel out flywheel precession and torque reaction when providing power to the drive wheels. This eliminates any adverse effect on the vehicle's behavior that might otherwise result such as causing the vehicle to spin on slippery surfaces.

15 Claims, 4 Drawing Sheets

MOTOR VEHICLE DRIVETRAIN HAVING AT LEAST TWO CNT'S AND FLYWHEELS

CROSS-REFERENCE TO RELATED APPLICATIONS

This application follows Provisional Application No. 60/432,944, with filing date of Dec. 12, 2002 which is claimed for this application.

BACKGROUND OF THE INVENTION

Motor vehicle drivetrain efficiency is constantly being improved, with a major advancement involving hybrid technology using a gasoline engine with a battery storage system and an electric motor. Current designs have included a regenerative braking feature that uses electric motor braking in order to recharge the storage batteries. Improved fuel economy is obtained by use of a relative small gasoline engine operating alternately with the electric motor. When the driver indicates demand for more power, both the gas and electric are utilized. The thermal efficiency of this design is the cumulative result of the gasoline engine, engine driven generator, storage battery, and electric motor. Each component reduces the overall efficiency. The regenerative braking recaptures some of this energy and is dependent on driving patterns. The more stop-and-go driving, the more regenerative braking will contribute to overall efficiency. Overall thermal efficiency is less than that of a gas engine alone but the lower average power results in better fuel economy.

All patents discovered involve gas-electric designs. No patents have been discovered that pertain to inertial (flywheel) storage.

Continuously variable transmissions date back at least 100 years, with most designs involving either pulley flange adjustments, or sliding gear arrangements. No patents were identified using the cog belt and high friction mated cones to accomplish ratio changes.

The following transmission designs were identified

| Patent Number | Inventor | |
|---|---|---|
| 6,055,880 | Gogovitza | May 2, 2000 |
| 1,868,676 | Stoeckicht | Jul. 26, 1932 |
| JP 200,133,0101 | Kino and Otani | Nov. 30, 2001 |
| 6,349,607 | Gogovitza | Feb. 26, 2002 |
| 4,533,011 | Heidemeyer | Aug. 6, 1985 |
| D 19, 917,276 | Lauer and Hofmann | Oct. 26, 2000 |
| 53,202 | Wait | Mar. 13, 1866 |

Specific problems with gas-electric hybrids include cost, weight of batteries and electric motor, and overall thermal efficiency are issues related to the current design approach. Motor vehicles currently available are reported to cost the manufacturer significantly more than the selling price. Battery disposal is also an issue that must be addressed in the future.

BRIEF SUMMARY OF THE INVENTION

The object of this invention is to provide a simpler and far more efficient motor vehicle drivetrain.

A small diesel engine (not part of this patent application) is envisioned to optimize the efficiency of any vehicle using this drivetrain. Because of the flywheel efficiency, a much smaller engine can be used, and, with the efficient recovery possible by using flywheel braking, very high fuel mileage is attainable.

Cost of a generator, batteries, and electric motor are significantly higher than the cost of a second continuously variable transmission and dual flywheels. By controlling the transmission, the engine can be operated at its peak thermal efficiency at all times. Engine life would also be increased. The weight of the flywheels (100 pounds each) and the $2^{nd}$ transmission would be somewhat less than the electric motor and batteries.

On cold startup, where the flywheels are stationary, the engine would gradually speed up the flywheels. At the same time the vehicle operator could transfer flywheel power to the drive wheels of the vehicle, with speed controlled by the ratio of the second transmission. If the power demanded for the vehicle is less overall than the power generated by the engine, the flywheels would accelerate to the speed allowed by onboard programmable logic controllers (not shown: not part of patent). Depending on the trip characteristics (speed changes, inclines) the flywheel would stabilize at a speed where driver power requirements could be smoothly met. Engine size and exact flywheel design would depend on the intended vehicle size and operating parameters.

DETAILED DESCRIPTION OF THE INVENTION

Figure 1:
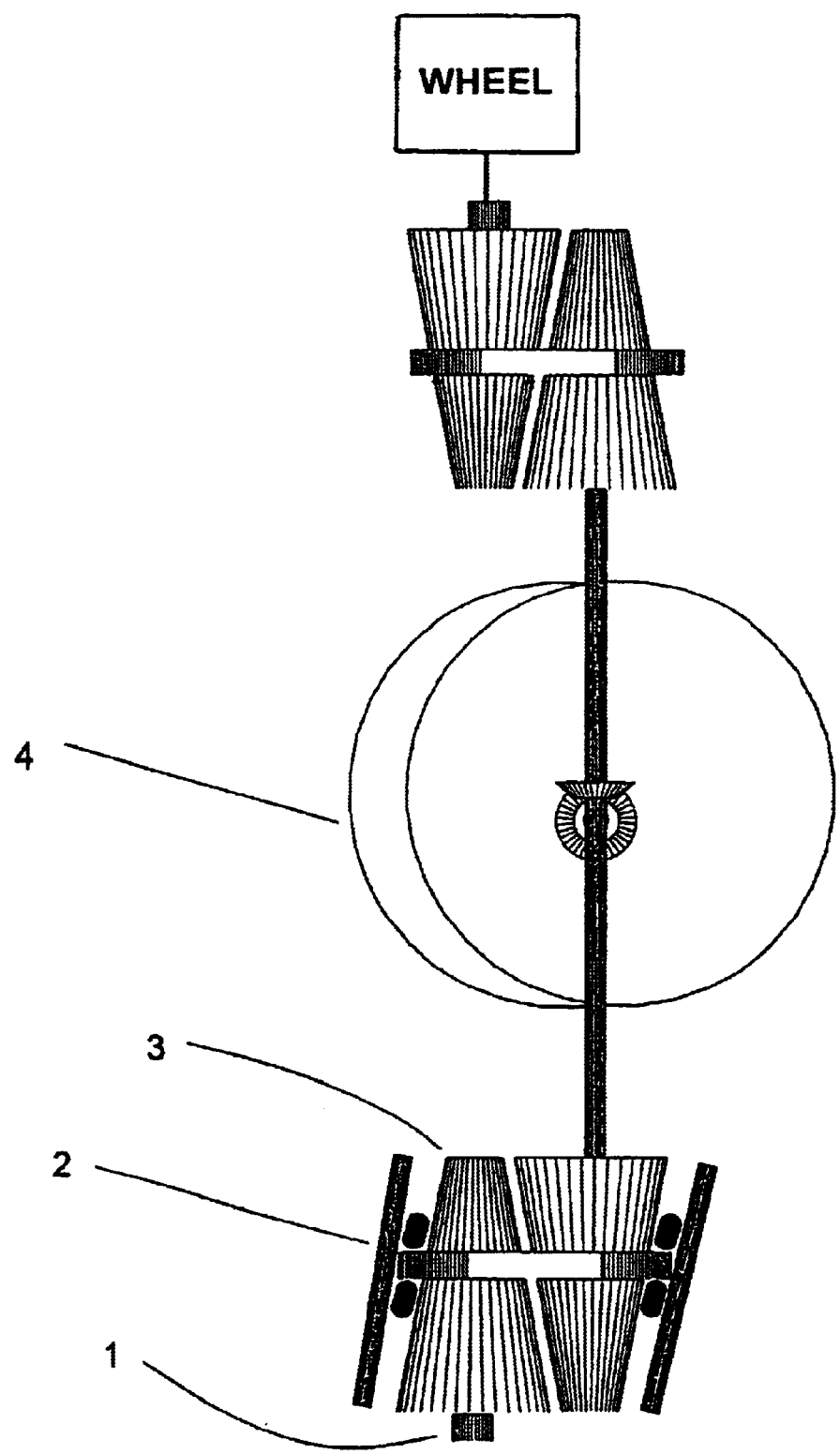
FIG. 1 Overall plan view of drivetrain showing input shaft (from torque converter, not shown), continuously variable transmission, flywheel set, $2^{nd}$ continously variable transmission, and output shaft (to vehicle driveshaft, not shown). Supporting brackets and bearings are not shown for clarity.
Figure 2:
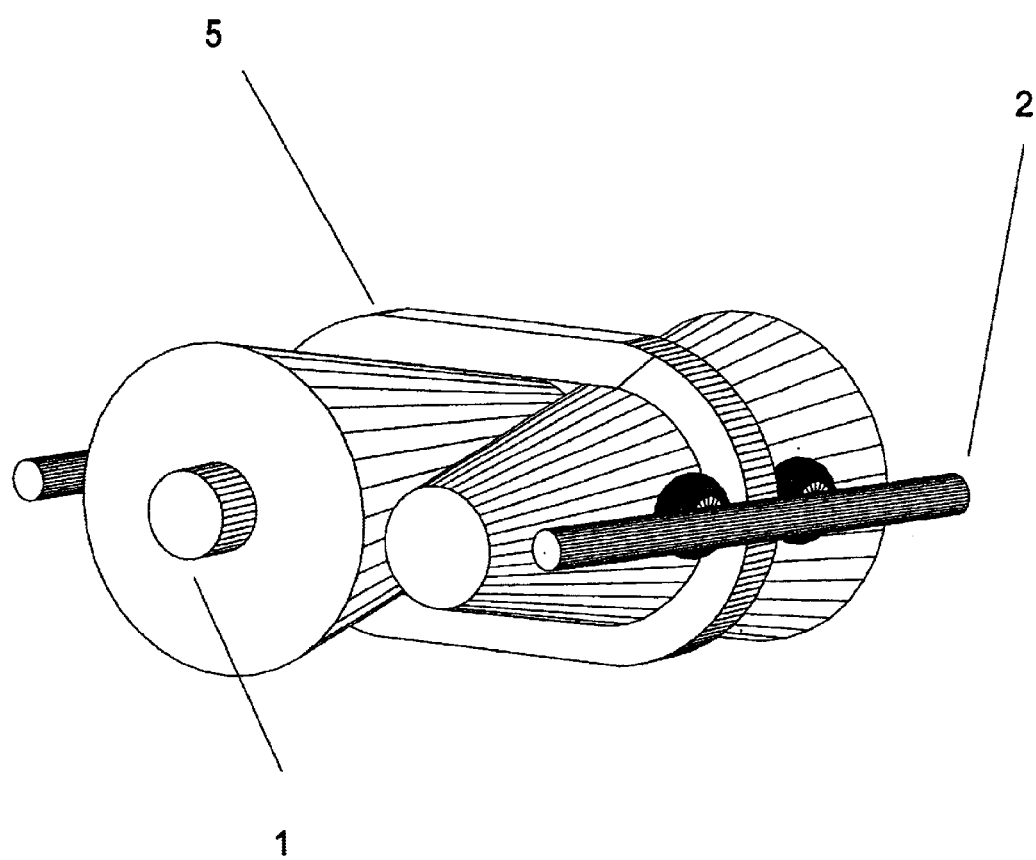
FIG. 2 Perspective view (shown at larger scale for clarity) of first continuously variable transmission operating between engine (not shown), and flywheel set (also not shown in this figure for clarity). The cog drive belt is shown, but necessary support brackets, panels, and bearings are omitted for clarity.
Figure 3:
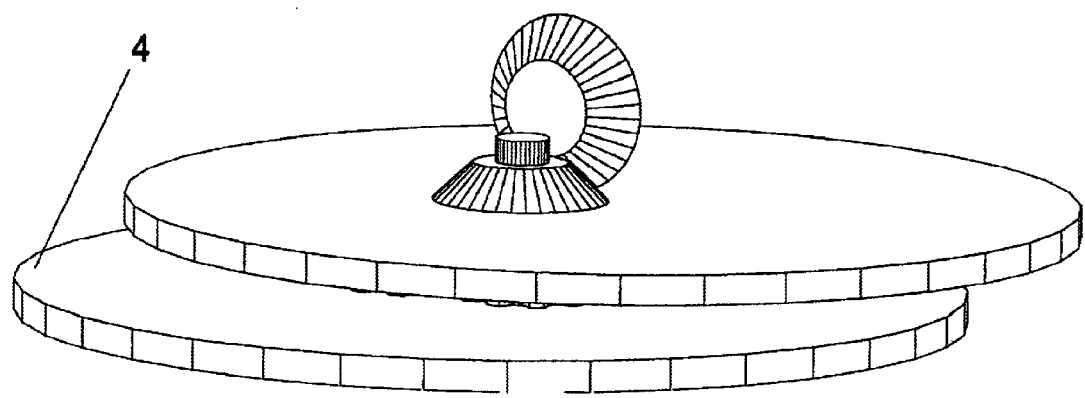
FIG. 3 Perspective view (shown at larger scale for clarity) of flywheel set showing two flywheels, mating gears, and driveshafts that connect to each of the two continously variable transmissions (not shown in this figure for clarity).
Figure 4:
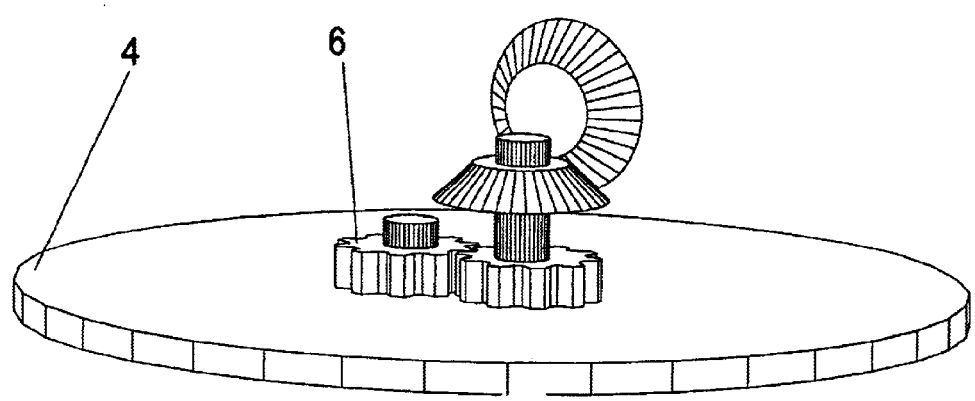
FIG. 4 Perspective view (shown at larger scale for clarity) of lower flywheel showing gearset linking flywheels in counter-rotation fashion.
Figure 5:
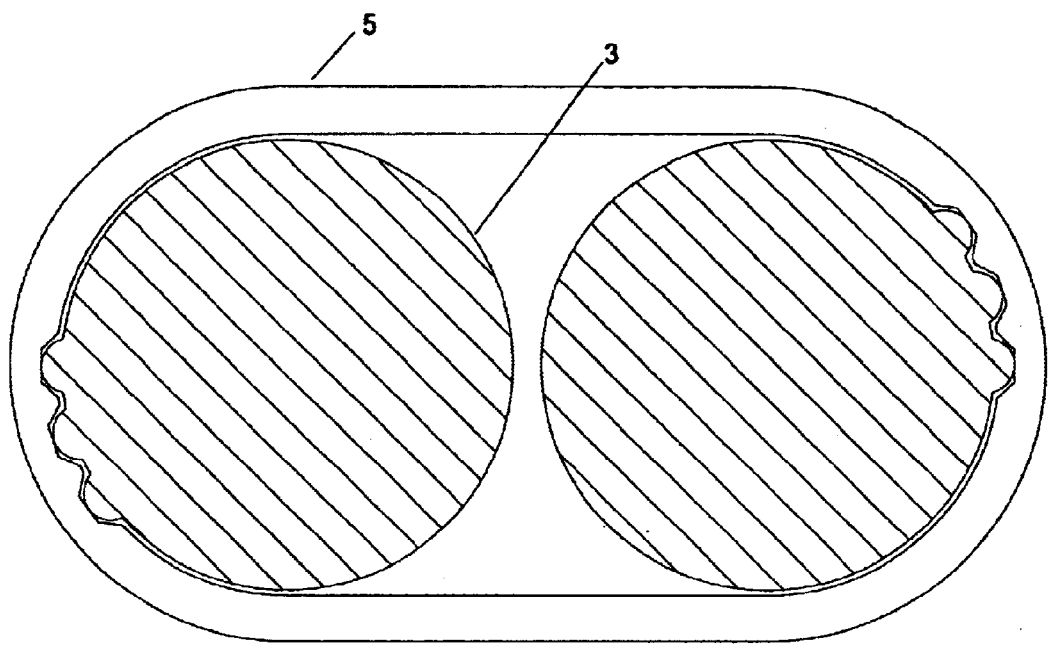
FIG. 5 Elevation section view showing transmission cones and drive belt engaged through belt cogs and spaced protrusions on surface of cones.
Figure 6:
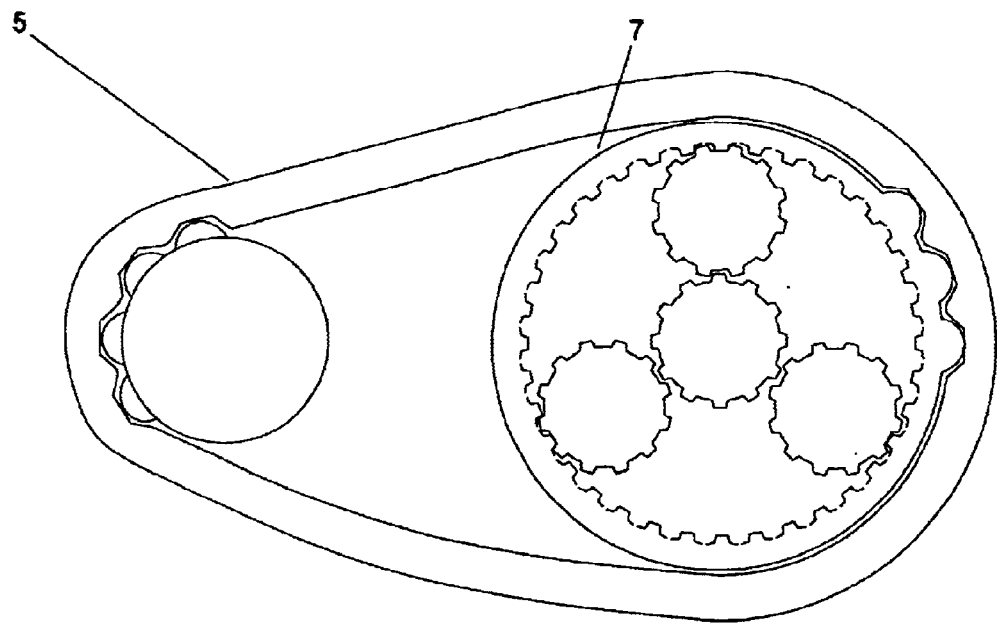
FIG. 6 Elevation view of final drive output and reverse gearset plus drive belt shown in low-ratio position.

A continously variable ratio transmission 3 (CVRT), transfers power from the engine torque converter via the input shaft 1 (not part of this patent application) to the flywheel set 4, is controlled by an onboard programmable logic controller (PLC). This PLC receives inputs from the input shaft's RPM, the flywheel set's RPM, and torque on the input shaft I and adjusts the transmission by moving the shuttle control 2 which moves the drive belt. The program is set to a constant torque and a maximum flywheel RPM is specified. Initially, the flywheel set is accelerated at the maximum torque specified, until, and if, it reaches maximum RPM. The torque and RPM maximum are dependent on flywheel material and design, and the intended goal of the programmer (acceleration vs high mileage). Once the flywheel reaches maximum speed, the torque is reduced by changing the ratio of CVRT 3, allowing the flywheel to slow as demand for power is received from the second CVRT. At all times the engine is held at a constant RPM and throttle position, determnined by where the highest thermal efficiency occurs for the particular engine.

The second CVRT is positioned between the flywheel set and the vehicle driveshaft. This CVRT is also controlled by a PLC (may be a $2^{nd}$ PLC, or the same used to control CVRT 3, depending on specific PLC selected). This PLC receives input from the driver (throttle position indicating need for more power), the flywheel speed, and road speed. The CVRT is adjusted to send the appropriate amount of torque to the vehicle driveshaft. This PLC also receives input from the brake pedal, and adjusts the CVRT to use flywheel braking (flywheel speeds up, vehicle slows down, just like engine braking). The torque to slow the vehicle is controlled by the pedal pressure indicated from a strain gauge, and limited by signals from the anti-lock braking system (if available, not included in this patent application). Energy previously expended to accelerate the vehicle is now recaptured in a higher flywheel speed. Over the course of a trip the flywheel set speed would be adjusted to reflect the pattern of energy requirements during the trip. At the end of the trip, the flywheel set may still be spinning. If the vehicle is restarted soon, some of this flywheel energy would be available for the next trip.

Both CVRTs have the same design except for the reverse gearing 7 in the CVRT positioned between the vehicle driveshaft and the flywheel. Each consists of two cones, positioned near each other, but not touching. Their axis are parallel and the small diameters face in opposite direction. Surrounding the dual cones is a cogged drive belt 5 held in a transfer shuttle 2, that is moved back and forth parallel to the surface of the transmission cones. The ratio is changed by the movement of this belt. The shuttle is controlled by the PLC described above. Each cone is a special construction of sintered metal, non-lubricated, to create a high friction surface that does not smooth with wear. A pattern of protrusions is also built into the surface of each cone such that the distance between protrusions is the same as the cog pitch on the belt. Toward the smaller end of the cone, there are fewer protrusions, but still spaced at the same distance as the cogs on the belt. Each row circling the cone is separated from the adjacent row by ⅓ the width of the belt. At any belt position at least 2 rows of protrusions mesh with the cog belt. A transfer shuttle encases the cogged drive belt and moves on guide rails in a line parallel with the slope of the drive cones. Worm gear positioners move the transfer shuttle powered by servos (not shown for clarity).

The output cone of the final CVRT contains the reverse gear assembly 7 that provides reverse gear. As the drive belt 5 moves to the independent section of the cone, a transition smooth transition area allows the transmission to shift into reverse. This section of the final drive cone is operating in reverse rotation to the main section of the cone.

The two flywheels are positively geared together with a set of meshed gears 6 resulting in each flywheel rotating in a different direction. A slight offset is required equal to the diameter of one gear. This counter-rotation essentially cancels out any precession effects from the flywheel, and also nullifies a torque reaction that would otherwise result when extracting power from the flywheels. This torque reaction would be especially undesireable when the vehicle was operating on slippery surfaces as there would be a tendancy to spin the vehicle.

The identical 100 pound flywheels are 3'6" in diameter, and are of the rim design with most of the mass at the rim. The web is a fiberglass disk, and the rim is mild steel. Two rims of approximately ½" thick and 1 ½" wide, depending on exact weight desired, with the fiberglass web positioned between the steel rims and fastened with through rivets. Each flywheel is contained within its own sealed enclosure to avoid energy loss due to winding, since they are turning in opposite directions. Guide bumper wheels are located around the perimeter, both above and below, to limit flexing of the flywheels during rapid up-and-down motion of the vehicle. An output shaft extends vertically from the upper flywheel, through the enclosure and is fitted with a beveled gear. This is mated to another beveled gear on the interconnecting drive shaft between the continously v ratio transmissions. Maximum speed is 2,000 RPM.

What is claimed is:

1. A method of storing energy in a motor vehicle drivetrain, comprising the steps of:

receiving torque from a power source;

connecting the torque to an input of a first continuously variable ratio transmission (first CVRT);

rotating a first flywheel with an output from said first CVRT in one direction;

rotating a second flywheel with said first flywheel in a direction opposite said first flywheel;

driving an input of a second CVRT with said output of said first CVRT; and driving at least one wheel of the motor vehicle with an output of said second CVRT.

2. The method of storing energy in a motor vehicle drivetrain of claim 1, further comprising the step of:

connecting an output of said first CVRT to an input of said second CVRT with a drive shaft.

3. The method of storing energy in a motor vehicle drivetrain of claim 2, further comprising the step of:

attaching a first beveled gear on said drive shaft, attaching a second beveled gear to said first flywheel, attaching a first meshed gear concentric to said second beveled gear, attaching a second meshed gear to said second flywheel, said second meshed gear being driven by said first meshed gear.

4. The method of storing energy in a motor vehicle drivetrain of claim 1, further comprising the step of:

retaining a reverse gear assembly in an output cone gear of said second CVRT.

5. The method of storing energy in a motor vehicle drivetrain of claim 1, further comprising the step of:

providing a first programmable logic controller for controlling a transfer shuttle of said first CVRT, providing a second programmable logic controller for controlling a transfer shuttle of said second CVRT.

6. A method of storing energy in a motor vehicle drivetrain, comprising the steps of:

receiving torque from a power source;

connecting the torque to an input of a first continuously variable ratio transmission (first CVRT);

rotating a first flywheel with an output from said first CVRT in one direction;

rotating a second flywheel with said first flywheel in a direction opposite said first flywheel;

driving an input of a second CVRT with said output of said first CVRT;

providing a pair of opposed cone gears engaged with each other through a cogged drive belt for said first and second CVRT; and driving at least one wheel of the motor vehicle with an output of said second CVRT.

7. The method of storing energy in a motor vehicle drivetrain of claim 6, further comprising the step of:

connecting an output of said first CVRT to an input of said second CVRT with a drive shaft.

8. The method of storing energy in a motor vehicle drivetrain of claim 7, further comprising the step of:

attaching a first beveled gear on said drive shaft, attaching a second beveled gear to said first flywheel, attaching a first meshed gear concentric to said second beveled gear, attaching a second meshed gear to said second flywheel, said second meshed gear being driven by said first meshed gear.

9. The method of storing energy in a motor vehicle drivetrain of claim 6, further comprising the step of:

retaining a reverse gear assembly in an output cone gear of said second CVRT.

10. The method of storing energy in a motor vehicle drivetrain of claim 6, further comprising the step of:

providing a first programmable logic controller for controlling a transfer shuttle of said first CVRT, providing a second programmable logic controller for controlling a transfer shuttle of said second CVRT.

11. A method of storing energy in a motor vehicle drivetrain, comprising the steps of:

receiving torque from a power source;

connecting the torque to an input of a first continuously variable ratio transmission (first CVRT);

rotating a first flywheel with an output from said first CVRT in one direction;

rotating a second flywheel with said first flywheel in a direction opposite said first flywheel;

driving an input of a second CVRT with said output of said first CVRT;

providing a pair of opposed cone gears engaged with each other through a cogged drive belt for said first and second CVRT, a transfer shuffle for moving the position of said cogged drive belt to change a gear ratio between said pair of cone gears; and driving at least one wheel of the motor vehicle with an output of said second CVRT.

12. The method of storing energy in a motor vehicle drivetrain of claim 11, further comprising the step of:

connecting an output of said first CVRT to an input of said second CVRT with a drive shaft.

13. The method of storing energy in a motor vehicle drivetrain of claim 12, further comprising the step of:

attaching a first beveled gear on said drive shaft, attaching a second beveled gear to said first flywheel, attaching a first meshed gear concentric to said second beveled gear, attaching a second meshed gear to said second flywheel, said second meshed gear being driven by said first meshed gear.

14. The method of storing energy in a motor vehicle drivetrain of claim 11, further comprising the step of:

retaining a reverse gear assembly in an output cone gear of said second CVRT.

15. The method of storing energy in a motor vehicle drivetrain of claim 11, further comprising the step of:

providing a first programmable logic controller for controlling a transfer shuttle of said first CVRT, providing a second programmable logic controller for controlling a transfer shuttle of said second CVRT.

* * * * *